US009368982B2

(12) United States Patent
Jansen et al.

(10) Patent No.: US 9,368,982 B2
(45) Date of Patent: Jun. 14, 2016

(54) WIRING DEVICE HAVING A HOUSING WITH MULTIPLE PORTIONS AND LOW VOLTAGE PORTS

(71) Applicant: Leviton Manufacturing Co., Inc., Melville, NY (US)

(72) Inventors: Ronald Jansen, Ridgewood, NY (US); Michael Kamor, N. Massapequa, NY (US); Eugene Frid, Great Neck, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 14/278,679

(22) Filed: May 15, 2014

(65) Prior Publication Data

US 2015/0038006 A1 Feb. 5, 2015

Related U.S. Application Data

(60) Provisional application No. 61/860,646, filed on Jul. 31, 2013.

(51) Int. Cl.
*H01R 13/516* (2006.01)
*H02J 7/00* (2006.01)
(Continued)

(52) U.S. Cl.
CPC ............ *H02J 7/0021* (2013.01); *H01R 13/516* (2013.01); *H01R 13/6666* (2013.01); *H01R 13/6675* (2013.01); *H01R 13/6683* (2013.01);
(Continued)

(58) Field of Classification Search
CPC ................. H01R 24/76–24/78; H01R 13/516; H01R 25/006

USPC .............................. 439/535; 174/53; 200/297
See application file for complete search history.

(56) References Cited

U.S. PATENT DOCUMENTS 3,688,239 A * 8/1972 Jaconette ........................ 439/97
5,472,350 A   12/1995 Mehta
5,954,523 A   9/1999 Babcock
(Continued)

FOREIGN PATENT DOCUMENTS

WO    WO 2012/068635 A1    5/2012

OTHER PUBLICATIONS

2012 EC&M Product of the Year Unveiled, EC&M Electrical Construction & Maintenance, Jul. 24, 2012, http://ecmweb.com/product-year/2012-ecm-product-year-unveiled.
(Continued)

*Primary Examiner* — Chandrika Prasad
(74) *Attorney, Agent, or Firm* — Carter, DeLuca, Farrell & Schmidt, LLP

(57) ABSTRACT

A wiring device for fastening in an electrical box is presented including a strap having first and second mounting holes to facilitate fastening of the wiring device to the electrical box, the first and second mounting holes lying on an axis parallel to a longitudinal axis and a housing having a face, the face having an area which is divided into first and second regions by a lateral axis, the lateral axis being perpendicular to the longitudinal axis. The wiring device further includes a first low voltage port being accessible through a first low voltage port aperture, a second low voltage port being accessible through a second low voltage port aperture, a third low voltage port being accessible through a third low voltage port aperture, and a fourth low voltage port being accessible through a fourth low voltage port aperture.

29 Claims, 9 Drawing Sheets

(51) Int. Cl.
*H01R 13/66* (2006.01)
*H01R 25/00* (2006.01)

(52) U.S. Cl.
CPC .............. *H01R 25/006* (2013.01); *H02J 7/007* (2013.01); *H02J 2007/0062* (2013.01)

(56) References Cited

U.S. PATENT DOCUMENTS

| | | | |
|---|---|---|---|
| 6,050,849 A | 4/2000 | Chang | |
| 6,056,578 A | 5/2000 | Lin | |
| 6,141,221 A | 10/2000 | Tong et al. | |
| 6,210,216 B1 | 4/2001 | Tso-Chin et al. | |
| 6,211,581 B1 | 4/2001 | Farrant | |
| 6,305,986 B1 | 10/2001 | Hwang | |
| 6,346,009 B1 | 2/2002 | Lin | |
| 6,362,987 B1 | 3/2002 | Yurek et al. | |
| D465,769 S | 11/2002 | Zhang et al. | |
| 6,512,682 B2 | 1/2003 | Coehn et al. | |
| 6,614,206 B1 | 9/2003 | Wong et al. | |
| 6,722,917 B2 | 4/2004 | Huang | |
| 6,722,924 B1 | 4/2004 | Zhou et al. | |
| 6,736,677 B1 | 5/2004 | Lin et al. | |
| 6,767,245 B2 | 7/2004 | King | |
| D494,934 S | 8/2004 | Milan | |
| 6,776,658 B2 | 8/2004 | Tang | |
| 6,799,997 B2 | 10/2004 | Lin et al. | |
| 6,811,415 B2 | 11/2004 | Chen | |
| 6,843,684 B2 | 1/2005 | Milan | |
| 6,923,663 B2 | 8/2005 | Oddsen et al. | |
| 6,936,936 B2 | 8/2005 | Fischer at al. | |
| 6,943,296 B2 | 9/2005 | Perrella et al. | |
| 7,075,004 B1 * | 7/2006 | Gretz ............................. | 174/50 |
| 7,140,922 B2 | 11/2006 | Luu et al. | |
| 7,167,372 B2 | 1/2007 | Mori et al. | |
| 7,170,259 B2 | 1/2007 | Veselic | |
| 7,195,500 B2 | 3/2007 | Huang et al. | |
| 7,211,986 B1 | 5/2007 | Flowerdew et al. | |
| 7,212,420 B2 | 5/2007 | Liao | |
| 7,239,111 B2 | 7/2007 | Fischer at al. | |
| 7,242,111 B2 | 7/2007 | Menas at al. | |
| 7,285,874 B2 | 10/2007 | Menas at al. | |
| 7,338,328 B2 | 3/2008 | Krieger et al. | |
| 7,358,703 B2 | 4/2008 | Veselic | |
| 7,453,233 B2 | 11/2008 | Fischer et al. | |
| 7,485,986 B2 | 2/2009 | Menas et al. | |
| 7,508,092 B2 | 3/2009 | Menas et al. | |
| 7,514,814 B2 | 4/2009 | Menas et al. | |
| 7,525,291 B1 | 4/2009 | Ferguson | |
| 7,528,323 B2 | 5/2009 | Wu et al. | |
| 7,528,582 B1 | 5/2009 | Ferguson | |
| 7,554,033 B1 | 6/2009 | Bhosale et al. | |
| 7,573,159 B1 | 8/2009 | Deluliis et al. | |
| 7,573,242 B2 | 8/2009 | Bayne et al. | |
| 7,579,711 B2 | 8/2009 | Menas et al. | |
| 7,595,446 B2 * | 9/2009 | Turcovsky et al. .............. | 174/50 |
| 7,602,079 B2 | 10/2009 | Menas et al. | |
| D607,816 S | 1/2010 | Chen et al. | |
| 7,646,107 B2 | 1/2010 | Smith | |
| 7,646,111 B2 | 1/2010 | Menas et al. | |
| 7,656,132 B2 | 2/2010 | So et al. | |
| 7,701,168 B2 | 4/2010 | Thijssen | |
| 7,714,534 B2 | 5/2010 | Bayne et al. | |
| 7,737,657 B2 | 6/2010 | Fischer et al. | |
| 7,741,870 B2 | 6/2010 | Hurtz et al. | |
| 7,759,906 B2 | 7/2010 | Ferguson | |
| 7,759,907 B2 | 7/2010 | Ferguson | |
| 7,766,698 B1 | 8/2010 | De lullis et al. | |
| 7,768,150 B2 | 8/2010 | Platania et al. | |
| 7,768,152 B2 | 8/2010 | Menas et al. | |
| 7,791,220 B2 | 9/2010 | Menas et al. | |
| 7,808,122 B2 | 10/2010 | Menas et al. | |
| 7,812,475 B2 | 10/2010 | Menas et al. | |
| 7,812,476 B2 | 10/2010 | Menas et al. | |
| 7,812,477 B2 | 10/2010 | Menas et al. | |
| 7,812,478 B1 | 10/2010 | Menas | |
| 7,812,565 B2 | 10/2010 | Bayne et al. | |
| 7,816,807 B2 | 10/2010 | Menas et al. | |
| 7,816,808 B2 | 10/2010 | Menas et al. | |
| 7,816,809 B2 | 10/2010 | Menas et al. | |
| 7,816,810 B2 | 10/2010 | Manes et al. | |
| 7,816,885 B2 | 10/2010 | Bayne et al. | |
| 7,834,586 B2 | 11/2010 | Fischer et al. | |
| 7,834,591 B2 | 11/2010 | Hussain et al. | |
| 7,855,528 B2 | 12/2010 | Lee | |
| 7,862,350 B2 | 1/2011 | Richter et al. | |
| 7,878,840 B2 | 2/2011 | Hankey et al. | |
| 7,886,104 B2 | 2/2011 | Lai et al. | |
| 7,893,653 B2 | 2/2011 | Bayne et al. | |
| 7,906,936 B2 | 3/2011 | Azancot et al. | |
| 7,910,833 B2 | 3/2011 | McGinley et al. | |
| RE42,385 E | 5/2011 | Wong et al. | |
| 7,960,859 B2 | 6/2011 | Menas et al. | |
| 7,960,944 B2 | 6/2011 | Hoffman et al. | |
| 7,978,489 B1 | 7/2011 | Telefus et al. | |
| 7,986,127 B2 | 7/2011 | Fischer et al. | |
| 7,997,925 B2 | 8/2011 | Lam et al. | |
| 8,011,937 B2 | 9/2011 | Oddsen et al. | |
| 8,033,846 B2 | 10/2011 | Youssefi-Shams et al. | |
| 8,052,486 B2 | 11/2011 | Lee et al. | |
| 8,057,265 B2 | 11/2011 | Youssefi-Shams et al. | |
| 8,096,818 B2 | 1/2012 | Arenas et al. | |
| 8,111,039 B2 | 2/2012 | Bayne et al. | |
| 8,115,591 B2 | 2/2012 | Fair et al. | |
| 8,134,254 B2 | 3/2012 | Makwinski | |
| 8,158,883 B2 * | 4/2012 | Soffer ............................ | 174/50 |
| 8,164,932 B2 | 4/2012 | Sims et al. | |
| 8,169,187 B2 | 5/2012 | Fischer et al. | |
| 8,170,623 B2 | 5/2012 | Dorogusker et al. | |
| 8,193,776 B2 | 6/2012 | Bayne et al. | |
| 8,193,779 B2 | 6/2012 | Ferguson | |
| 8,212,386 B2 | 7/2012 | Mahaffey | |
| 8,217,621 B2 | 7/2012 | Tsai et al. | |
| 8,219,729 B1 | 7/2012 | Wright | |
| 8,222,773 B2 | 7/2012 | De lullis et al. | |
| 8,232,766 B2 | 7/2012 | Fischer et al. | |
| 8,242,359 B2 | 8/2012 | McGinley et al. | |
| 8,261,100 B2 | 9/2012 | Paniagua, Jr. et al. | |
| 8,272,899 B2 | 9/2012 | Youssefi-Shams et al. | |
| 8,296,587 B2 | 10/2012 | Paniagua, Jr. et al. | |
| 8,301,814 B2 | 10/2012 | Ejiri | |
| 8,308,496 B2 | 11/2012 | Youssefi-Shams et al. | |
| 8,321,603 B2 | 11/2012 | Singh et al. | |
| 8,330,422 B2 | 12/2012 | Bayne et al. | |
| 8,352,644 B2 | 1/2013 | Malamant et al. | |
| 8,362,713 B2 | 1/2013 | Recker et al. | |
| 8,362,745 B2 | 1/2013 | Tinaphong | |
| 8,373,387 B2 | 2/2013 | Bourilkov et al. | |
| 8,380,998 B2 | 2/2013 | Azancot et al. | |
| 8,384,241 B2 | 2/2013 | Chen et al. | |
| 8,386,814 B2 | 2/2013 | Tom et al. | |
| 8,415,901 B2 | 4/2013 | Recker et al. | |
| 8,439,692 B1 | 5/2013 | Oddsen et al. | |
| 8,446,134 B2 | 5/2013 | Manor et al. | |
| 8,450,980 B2 | 5/2013 | Kumar et al. | |
| 8,469,746 B2 | 6/2013 | Kemp | |
| 8,475,187 B2 | 7/2013 | Youssefi-Shams et al. | |
| 8,480,418 B2 | 7/2013 | Youssefi-Shams et al. | |
| 8,496,342 B2 | 7/2013 | Misener | |
| 8,497,659 B2 | 7/2013 | Navid | |
| 8,536,840 B2 | 9/2013 | Walter et al. | |
| 8,542,819 B2 | 9/2013 | Hazani et al. | |
| 8,545,039 B2 | 10/2013 | Patel | |
| 8,550,857 B2 | 10/2013 | Youssefi-Shams et al. | |
| 8,575,889 B2 | 11/2013 | Platania et al. | |
| 8,583,955 B2 | 11/2013 | Lu et al. | |
| 8,593,115 B2 | 11/2013 | Walter et al. | |
| 8,613,824 B2 | 12/2013 | Kappacher et al. | |
| 8,758,031 B2 | 6/2014 | Cheng et al. | |
| 9,083,180 B2 * | 7/2015 | Dodal et al. | |
| 2003/0109173 A1 * | 6/2003 | Kidman ...................... | 439/535 |
| 2003/0211300 A1 * | 11/2003 | Kiyotaki .................... | 428/195.1 |
| 2005/0088834 A1 | 4/2005 | Milan | |
| 2006/0085584 A1 | 4/2006 | Chen et al. | |

(56) References Cited

U.S. PATENT DOCUMENTS

| | | |
|---|---|---|
| 2007/0015401 A1 | 1/2007 | Sun |
| 2007/0072476 A1 | 3/2007 | Milan |
| 2007/0182363 A1 | 8/2007 | Yang |
| 2007/0247800 A1 | 10/2007 | Smith et al. |
| 2008/0012423 A1* | 1/2008 | Mimran ................ 307/11 |
| 2008/0073117 A1 | 3/2008 | Misener |
| 2008/0122292 A1 | 5/2008 | Minami |
| 2008/0318474 A1 | 12/2008 | Crotinger et al. |
| 2009/0177906 A1 | 7/2009 | Paniagua, Jr. et al. |
| 2010/0246232 A1 | 9/2010 | Chen et al. |
| 2010/0280671 A1 | 11/2010 | Lee |
| 2011/0035624 A1 | 2/2011 | Miller |
| 2011/0095722 A1 | 4/2011 | Chang |
| 2012/0166173 A1 | 6/2012 | Fischbach |
| 2012/0276763 A1* | 11/2012 | Quezada ................ 439/108 |
| 2012/0292991 A1 | 11/2012 | Dodal et al. |

OTHER PUBLICATIONS

U-Socket Installation Guide 2012.
Bryant Electric, New Dual USB Charger Duplex Receptacles from Bryant Electric, Shelton, CN, Jun. 2013, www.hubbell-bryant.com/PressReleaseDetail.aspx?Id=7, printed Mar. 11, 2015.

* cited by examiner

WIRING DEVICE HAVING A HOUSING WITH MULTIPLE PORTIONS AND LOW VOLTAGE PORTS

CROSS-REFERENCE TO RELATED APPLICATION

The present application claims the benefit of and priority to U.S. Provisional Application Ser. No. 61/860,646 filed on Jul. 31, 2013, the entire contents of which are incorporated herein by reference.

BACKGROUND

1. Technical Field

The present disclosure relates to a wiring device and, more particularly, but not exclusively, relates to a wiring device having low voltage data ports.

2. Background of Relevant Art

All residential buildings have wall outlets for powering electronic devices such as lights, appliances, computers, and mobile devices. A wall outlet is sometimes referred to as an alternating current (AC) wall charger because most conventional wall outlets charge AC powered devices. The AC powered devices have a power cord with a plug configured to be connected to and removed from the wall outlet.

An outlet is a female connector with slots or holes in the wall outlet. The slots are configured to receive a male connector often referred to as a plug. The plug has protruding prongs, blades, or pins that fit into matching slots in the wall outlet. The wall outlet is enclosed by a cover typically called a wall plate, face plate, outlet cover, socket cover, or wall cover. Different countries have different national standards for wall outlets. The national standards differ by voltage rating, current rating, connector shape, connector size, and connector type.

Due to proliferation of various rechargeable consumer electronic devices, such as cell phones, laptops, tablets, personal digital assistants (PDA's), and the like, there is a need to charge and/or connect to such devices. Most of these devices are powered by low voltage. Recharging these devices may be facilitated through the use of standard interfaces, such as a Universal Serial Bus (USB).

Thus, there is a need to integrate one or more low voltage ports into a standard electrical installation in a wall/ceiling of a building.

SUMMARY

The following presents a summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

According to one aspect of the present disclosure, there is presented a wiring device. The wiring device includes a strap having first and second mounting holes to facilitate fastening of the wiring device to the electrical box, the first and second mounting holes lying on an axis parallel to a longitudinal axis and a housing having a face, the face being user-accessible once the wiring device is fastened to the electrical box, the face having an area which is divided into first and second regions by a lateral axis, the lateral axis being perpendicular to the longitudinal axis. The wiring device further includes a first low voltage port being accessible through a first low voltage port aperture on the first region of the face, the first low voltage port aperture positioned along an axis substantially parallel to the longitudinal axis, and a second low voltage port being accessible through a second low voltage port aperture on the first region of the face, the second low voltage port aperture positioned along an axis substantially parallel to the longitudinal axis. The wiring device further includes a first line voltage electrical outlet configured to receive a mating electrical plug, the first line voltage electrical outlet being accessible through a plurality of outlet apertures on the second region of the face.

According to another aspect of the present disclosure, a wiring device is presented. The wiring device includes a strap having first and second mounting holes to facilitate fastening of the wiring device to the electrical box, the first and second mounting holes lying on an axis parallel to a longitudinal axis and a housing having a face, the face being user-accessible once the wiring device is fastened to the electrical box, the face having an area which is divided into first and second regions by a lateral axis, the lateral axis being perpendicular to the longitudinal axis. The wiring device also includes a first low voltage port being accessible through a first low voltage port aperture on the first region of the face, a second low voltage port being accessible through a second low voltage port aperture on the first region of the face, a third low voltage port being accessible through a third low voltage port aperture on the second region of the face, and a fourth low voltage port being accessible through a fourth low voltage port aperture on the second region of the face. The first, second, third, and fourth low voltage port apertures are each positioned along a respective axis and each respective axis is substantially parallel to the longitudinal axis.

According to a further aspect of the present disclosure, a wiring device is presented. The wiring device includes a strap adapted and configured to fasten the wiring device to the electrical box and a housing configured to substantially enclose the internal components of the wiring device. The housing further includes a first housing portion and a second housing portion, wherein the first and second housing portions are adapted and configured to be assembled together, such that the first and second housing portions mate along a plane perpendicular to the surface of the building.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

Figure 2:
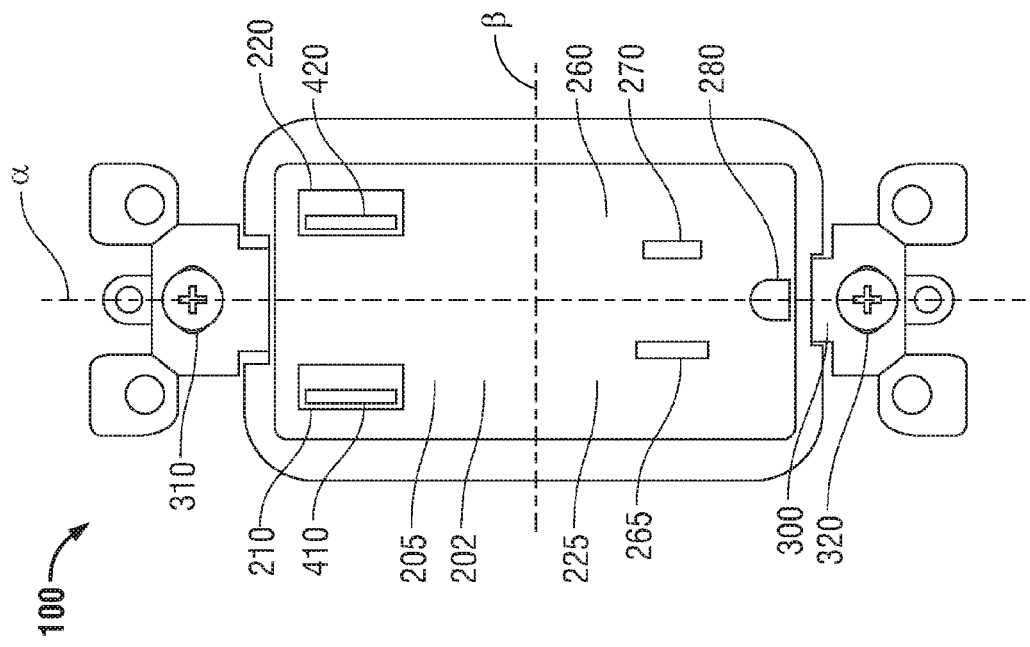
FIG. 2 is a front view of the wiring device of FIG. 1, according to the disclosure.

The figures depict preferred embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

Particular embodiments of the present disclosure are described hereinbelow with reference to the accompanying drawings. However, it is to be understood that the disclosed embodiments are merely exemplary of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Certain terminology is used in the following description for convenience only and is not limiting. The words "right," "left," "top," "horizontal," and "vertical" designate directions in the drawings to which reference is made. The terminology includes the above-listed words, derivatives thereof and words of similar import.

Wiring devices are typically fastened to electrical boxes in walls and ceilings of buildings or in other suitable locations. Some examples of wiring devices include, but are not limited to switches, outlets, circuit interrupters, dimmers, occupancy sensors, and the like. Additionally, any suitable combinations of these devices can be integrated into a single wiring device.

The sizes of electrical boxes have been standardized within the electrical industry and are typically provided with one or more gangs, such as single, double, triple, and so on. A single gang electrical box is typically 3" high by 2" wide, and may have any suitable depth such as 2", 3", and so on.

Line voltage refers to a voltage, typically Alternating Current (AC), that is supplied to buildings/residences (e.g., electric light and power), for example, 110 VAC, 115 VAC, 120 VAC, 125 VAC, 208 VAC, 220 VAC, 230 VAC, 240 VAC, single or multiphase. Line voltage is typically made available to the end user standard plug/outlet configurations standardized by the National Electrical Manufacturers' Association (NEMA) configurations. One such standardized configuration is a NEMA 5-15 configuration which denotes a nominal 125 VAC/15 Amp outlet.

Low voltage refers to a voltage which is less than a certain threshold (50 Volts for example, AC or DC). This reduced voltage is typically used for communication, signaling, data/multimedia transmission, low voltage charging, and the like. For the purposes of this application, the term low voltage also includes optical transmission (although no electrical voltage is actually transmitted by optical transmission).

Low voltage ports denote any suitable type of low voltage ports, such as, but not limited, to Universal Serial Bus (USB), Audio/Video/Multimedia ports, Digital Visual Interface (DVI), Ethernet/data ports, High Definition Multimedia Interface (HDMI), IEEE 1394 (FireWire), Separate Video (S-Video), Video Graphics Array (VGA), Telephone, and the like, or any suitable combination thereof. For the purposes of this application, low voltage ports can also include fiber optic ports (although no electrical voltage is actually transmitted by fiber optic ports).

USB ports can further be broken out into various form factors such as Type A, Type B, Mini-A, Mini-B, Micro-A, Micro-B, or any other suitable form.

As will be generally understood by one skilled in the art, the present disclosure is directed to a wiring device with one or more integrated low voltage ports. A first embodiment discloses a wiring device with a face having top and bottom regions where the top region includes two vertically oriented low voltage ports and the bottom region includes a line voltage electrical outlet. A second embodiment discloses a wiring device with four vertically oriented low voltage ports with two low voltage ports being provided on each of the top and bottom regions of the face. More specifically, the low voltage ports are USB charging ports configured to allow for charging cell phones, laptops, tablets, personal digital assistants (PDA's) and similar devices. The wiring device includes circuitry to convert line voltage to low voltage which powers the USB charging ports.

The vertical orientation of the USB charging ports allow for the ports to be offset by a greater distance from the center of the face than if the ports were oriented horizontally. The greater offset minimizes the potential for a user to mistakenly plug a line voltage electrical plug into the USB charging ports. Additionally, in the case of the first embodiment, by orienting the USB ports vertically, the vertical ports allow for the cable which is plugged into the USB charging ports to hang downwards and to the side of the line voltage electrical outlet, thus the cables do not block the line voltage electrical outlet. The greater offset of the USB charging ports also results in a more aesthetically pleasing appearance.

Figure 1:
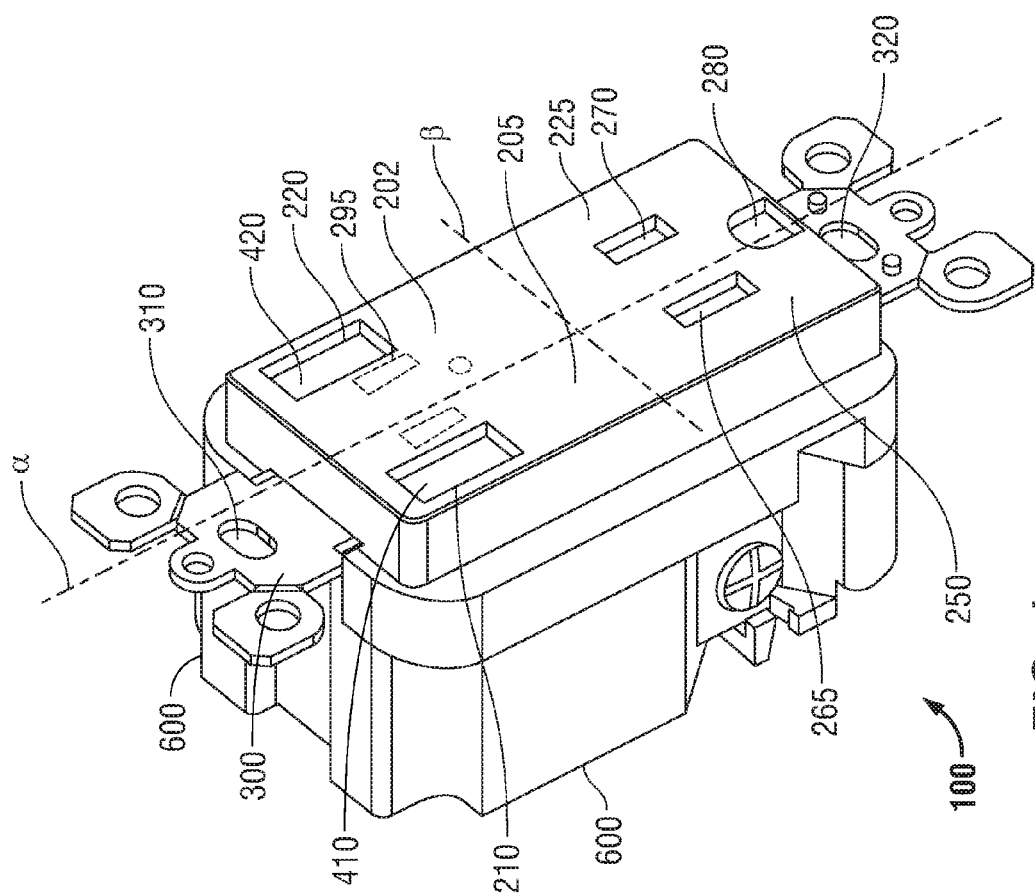
FIG. 1 is a perspective view of a first embodiment of a wiring device with low voltage ports, according to the disclosure.

FIGS. 1 and 2 describe the first embodiment of wiring device 100 configured to be fastened to an electrical box. Wiring device 100 includes a user-accessible face 202 which is accessible after wiring device 100 is fastened to the electrical box. Face 202 includes top and bottom regions, the top region having two vertical low voltage ports (e.g., USB charging ports) and the bottom region having a line voltage electrical outlet. In this embodiment, face 202 is generally rectangular but can take any suitable shape. This rectangular shape is sometimes referred to as "decorator style" in the electrical industry. Alternatively, face 202 can be comprised of two or more regions which are contiguous. Such is the case of a traditional wiring device known as a duplex device, which includes two separate regions, each region having any suitable shape.

The area of face 202 includes a longitudinal axis α and a lateral axis β. Longitudinal axis α divides the area of face 202 parallel to the long dimension of the face into right and left regions. Lateral axis β divides the area of the face parallel to the short dimension of the face into top and bottom regions. Lateral axis β is at a right angle to longitudinal axis α. In the present embodiment, longitudinal axis α and lateral axis β each bisect the area of the face. However, in other embodiments, longitudinal axis α and lateral β axis may divide the area of the face into unequal areas.

Face 202 includes a first region 205 (e.g., a top half) and a second region 225 (e.g., a bottom half) which are located on opposite sides of the lateral axis β (i.e., the lateral axis β divides the area of the face 202 into top and bottom halves).

First region 205 of face 202 includes first and second low voltage port apertures 210 and 220. First low voltage port aperture 210 is elongated along an axis which is parallel to longitudinal axis α. Likewise, second low voltage port aperture 220 is also elongated along an axis which is parallel to longitudinal axis α. Both first and second low voltage port apertures 210 and 220 are offset from longitudinal axis α.

Second region 205 includes a line voltage electrical outlet 260 which further includes first, second, and third outlet apertures 265, 270, and 280. In the present embodiment, the line voltage electrical outlet 260 is a standard NEMA 5-15 configuration. In this embodiment, first, second, and third outlet apertures 265, 270, and 280, allow for passage of neutral, phase, and ground plug blades/prongs, respectively, through the face and into electrical communication with internal electrical contacts.

An additional embodiment may further include a second line voltage electrical outlet 295 on the first region 205 of face 202. This second line voltage electrical outlet 295 may be located between first and second low voltage port apertures 210 and 220. The second line voltage electrical outlet 295 can be the same or a different NEMA configuration as the first line voltage electrical outlet 260. If the second line voltage electrical outlet 295 is the same NEMA configuration of the first line voltage electrical outlet 260, these two line voltage electrical outlets may be oriented in the same orientation with respect to the face 202. Alternatively, they may be positioned opposite from one another such that the ground aperture (such as the third outlet aperture 280 of line voltage electrical outlet 260) of the bottom line voltage electrical outlet is closest to the bottom short side of face 202 and the ground aperture of the top line voltage electrical outlet is located closest to the top short side of face 202.

The low voltage port apertures 210 and 220 are offset from the center of the face by a greater distance than the first and second outlet apertures 265 and 270, respectively, of the line voltage electrical outlet 260. This minimizes the potential of an end-user inadvertently plugging a line voltage electrical plug into the low voltage ports. It also avoids having the low voltage cable hang in front of the line voltage electrical outlet 260 since any low voltage cables would hang down to the side of line voltage electrical outlet 260 when the wiring device is fastened such that the longitudinal axis α is vertical. In addition, it results in a neater and more attractive appearance.

More specifically, the short dimension of the generally rectangular face 202 is approximately 1.28" and the first and second low voltage port apertures 210 and 220 are each offset from the longitudinal axis α by approximately 0.43" (the center-to-center spacing of the first and second low voltage port apertures 210 and 220 is approximately 0.85"). The first and second outlet apertures 265 and 270 are each offset from the longitudinal axis α by about 0.25" (the center-to-center spacing of the first and second outlet apertures 265 and 270 is 0.5"). In other words, first low voltage port aperture 210 is closer to one of the long sides of face 202 than first outlet aperture 265. For example, first and second low voltage port apertures 210 and 220 are offset from longitudinal axis α by roughly 70% more than first and second outlet apertures 265 and 270. These dimensions are exemplary in nature and other dimensions are envisioned including where the low voltage ports are spaced the same dimension as the outlet apertures.

Low voltage port apertures 210 and 220 permit access to first and second low voltage ports 410 and 420 of wiring device 100. In the present embodiment, these low voltage ports are in the form of USB charging ports that can be used to charge any suitable equipment, such as, but not limited to, cell phones, tablets, laptops, and the like.

These low voltage ports 410 and 420 can be configured to provide a predetermined amount of charging current, or they may provide an amount of current required by the charged device (i.e., an on-demand current). In addition, low voltage ports 410 and 420 can be configured to provide a level of charging current based on the type of device that is plugged into low voltage ports 410 and 420. Additionally, low voltage ports 410 and 420 can provide the same or different levels of charging current. Low voltage ports 410 and 420 can communicate in any suitable manner with the device(s) plugged into low voltage ports 410 and 420 (or any other device). Such communication can be in any suitable form such as unidirectional (one way), bidirectional (two way), wired, optically, and so on. In addition, such communication can utilize any suitable protocol or combinations of protocols, such as, but not limited to, Transmission Control Protocol/Internet Protocol (TCP/IP).

These low voltage ports 410 and 420 can optionally be configured to be controlled and/or connected in any suitable manner by wiring device 100 or by remote devices. In the case of remote devices, these could be on a local network (e.g., LAN/Wi-Fi), and/or on a remote network (e.g., WAN/Internet).

Additionally, low voltage ports 410 and 420 can optionally be configured to simply transmit data or perform any other suitable function, or any suitable combination of functions. For example, low voltage ports 410 and 420 may include an additional connector on the rear side of wiring device 100 configured to receive a data cable from within the wall that wiring device 100 is mounted in.

Wiring device 100 also includes a strap 300 which is used to fasten the wiring device 100 to an electrical box. As will be understood by one of ordinary skill in the art, the strap 300 includes a first mounting aperture 310 and a second mounting aperture 320 which receive screws which fasten the wiring device 100 to the electrical box. Housing 600, in combination with the face 202, cooperate to enclose the internal components of wiring device 100. Alternatively, other suitable embodiments of wiring device 100 which do not contain line voltage may be fastened to a mud ring instead of an electrical box.

Figure 3:
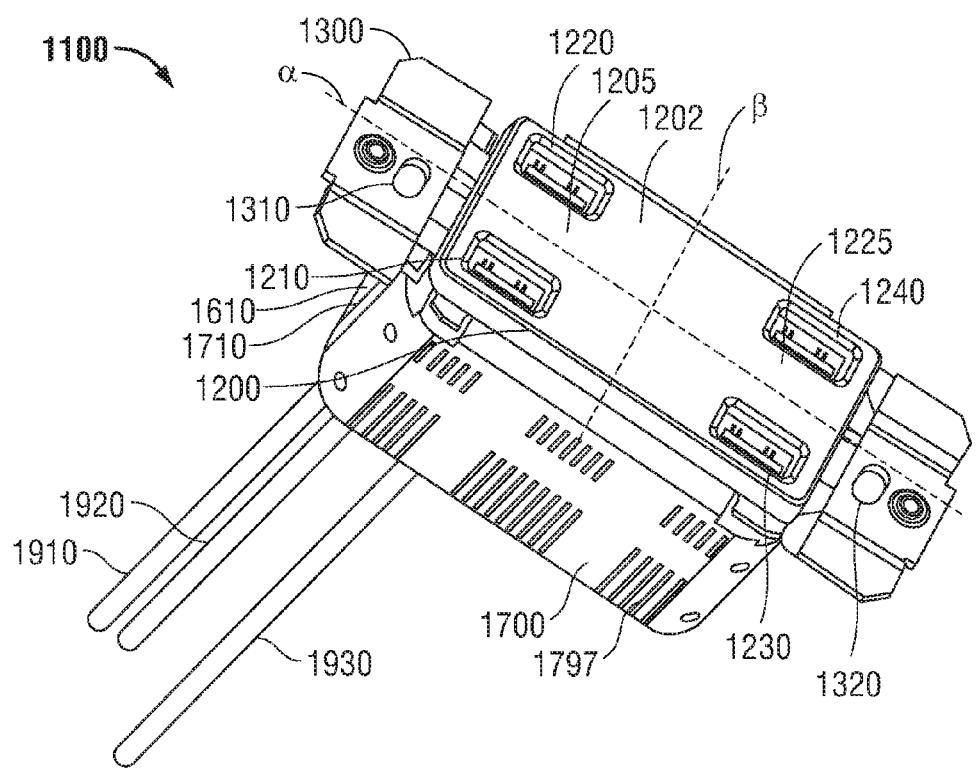
FIG. 3 is a perspective view of a second embodiment of a wiring device with low voltage ports, according to the disclosure.

FIG. 3 contains a second embodiment of wiring device 1100. Wiring device 1100 includes four vertically oriented low voltage ports (e.g., USB charging ports) and is similar to the first embodiment except that the line voltage electrical outlet of the first embodiment is replaced by two additional low voltage ports in the second embodiment.

Wiring device 1100 includes a generally rectangular face 1202 and the area of face 1202 includes a longitudinal axis α and a lateral axis β. Longitudinal axis α bisects the area of face 1202 parallel to the long dimension of the face dividing the face into right and left regions. Lateral axis β bisects the area of the face 1202 parallel to the short dimension of the face, dividing the face into top and bottom regions. Lateral axis β is at a right angle to longitudinal axis α.

Face 1202 includes a first region 1205 (e.g., a top half) and a second region 1225 (e.g., a bottom half) located on opposite sides of lateral axis β. First region 1205 of face 1202 includes first and second low voltage port apertures 1210 and 1220. First low voltage port aperture 1210 is elongated (or positioned) along an axis which is parallel to longitudinal axis α. Second low voltage port aperture 1220 is also elongated (or positioned) along an axis which is parallel to longitudinal axis α. Both first and second low voltage port apertures 1210 and 1220 are offset from longitudinal axis α. Offsetting first and second low voltage port apertures 1210 and 1220 from longitudinal axis α results in a neater and more attractive appearance.

Likewise, second region 1225 located on face 1202 includes third and fourth low voltage port apertures 1230 and 1240, each of which is similarly offset from, and elongated (or positioned) along a respective axis parallel to, longitudinal axis α.

The short dimension of the generally rectangular face is approximately 1.28". The center-to-center distance between first and second low voltage port apertures 1210 and 1220 is approximately 0.8" (i.e., offset from longitudinal axis α by approximately 0.4"). In other words, the center-to-center distance between the first and second low voltage port apertures (and the third and fourth low voltage port apertures) is approximately 60% of the width of the face. In the present embodiment, the spacing between the first and second voltage port apertures 1210 and 1220 is the same as the spacing between the third and fourth voltage port apertures 1230 and 1240. However, in other embodiments, the spacing may be different. The center-to-center distance between the low voltage port apertures in the second embodiment is closer that the center-to-center distance between the low voltage port apertures in the first embodiment. The closer spacing of the low voltage port apertures in the second embodiment allows for the housing to provide greater support near the low voltage ports. These dimensions are exemplary in nature and other dimensions are envisioned.

The configuration and arrangement of the housing/enclosure of the wiring device will now be described. While the housing will be described in connection with wiring device 1100, those skilled in the art will appreciate that it is equally applicable to wiring device 100, and any other wiring device now or hereafter envisioned Referring to FIG. 5, a strap 1300 for facilitating fastening the wiring device to the electrical box is shown. Strap 1300 provides protection of various components should an impact occur to wiring device 1100. Additionally, various features of strap 1300 facilitate and reinforce the assembly of wiring device 1100.

Figure 4:
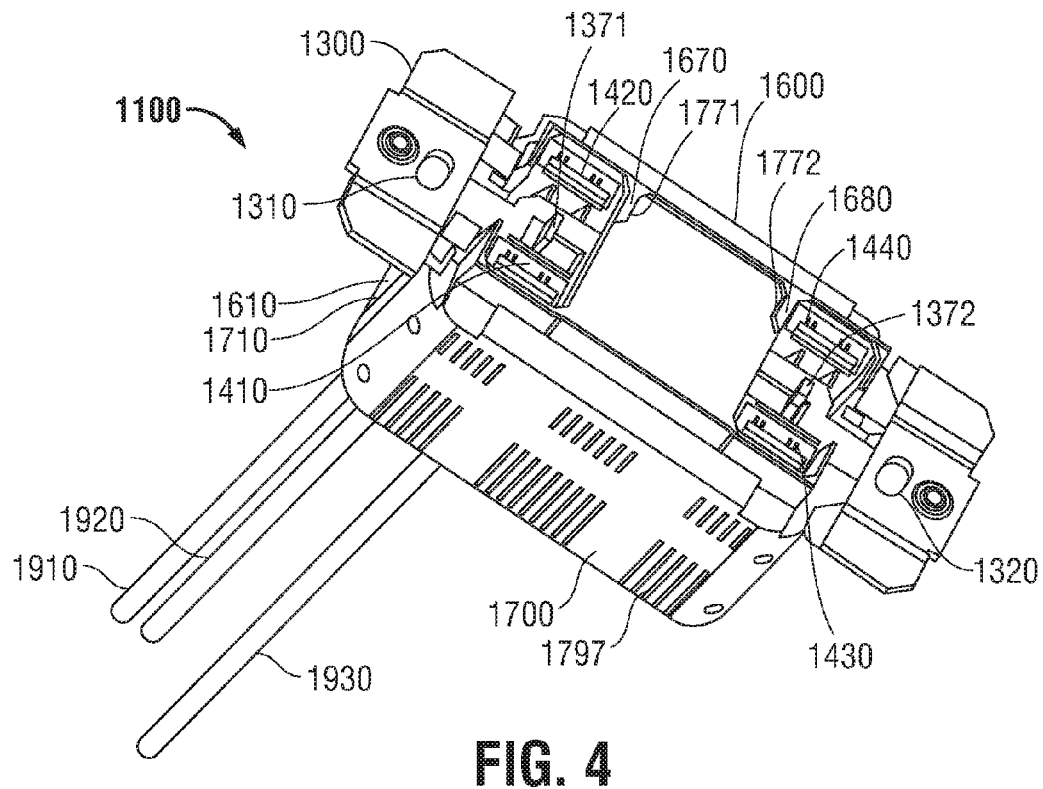
FIG. 4 is a perspective view of the wiring device of FIG. 3 with the face structure omitted for clarity, according to the disclosure.
Figure 5:
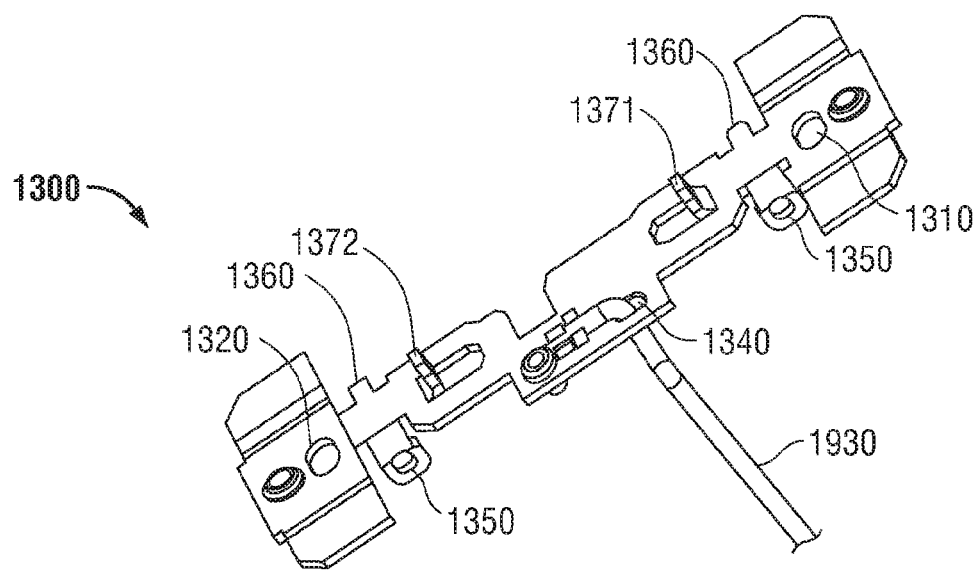
FIG. 5 is a perspective view of the strap of the wiring device of FIG. 3, according to the disclosure.

Strap 1300 includes at least one strap tab to provide impact resistance. As shown in FIG. 5, strap 1300 includes first and second strap tabs 1371 and 1372. Referring to FIG. 4, in the wiring device's 1100 assembled state, it is noted that first strap tab 1371 is located between low voltage ports 1410 and 1420 and second strap tab 1372 is located between low voltage ports 1430 and 1440. By locating a strap tab between each pair of low voltage ports, strap tabs 1371 and 1372 are positioned to provide additional protection to the low voltage ports should an impact to the face occur. Additionally, or alternatively, strap 1300 and/or strap tabs 1371 and 1372 may help protect other internal components of wiring device 1100 from some or all of the force of impact.

More specifically, each strap tab 1371 and 1372 projects from strap 1300 towards face structure 1200 such that the distal end of each strap tab 1371 and 1372 is positioned behind face structure 1200. Thus, strap tabs 1371 and 1372 provide support for and reinforcement of face structure 1200 (either directly or indirectly) should an impact occur to face structure 1200. Each strap tab 1371 and 1372 may contact the rear side of face structure 1200 or be separated from face structure 1200 by a gap (strap tabs 1371 and 1372 may only come into contact the rear side of face structure 1200 during an impact). Alternatively, one or more intervening elements/structures may be located between the strap tabs 1371 and 1372 and face structure 1200. Strap tabs 1371 and 1372 may be located in any suitable location on strap 1300 and may be of any suitable shape. In addition, should an impact occur to face structure 1200, some of the force of impact will be transmitted to strap 1300 through strap tabs 1371 and 1372, thus helping to protect low voltage ports 1410, 1420, 1430, and 1440 from some or all of the force of impact.

As stated above, various features of strap 1300 facilitate and reinforce the assembly of wiring device 1100. Strap 1300 may also include one or more support apertures 1350. Support apertures 1350 can be positioned such that when first and second housings 1600 and 1700 are assembled, one or more fasteners or elongated members may project through first and second housings 1600 and 1700 and also through support apertures 1350, thereby at least partially inhibiting displacement of the strap 1300 from the first and second housings 1600 and 1700.

In addition, strap 1300 may include one or more strap projections 1360 which project outward from strap 1300 and into one or more recesses 1760 of housing 1700 (to be discussed in greater detail below).

Strap 1300 also includes a strap aperture 1340 to facilitate passage therethrough of third conductor 1930 such as a ground conductor. Strap aperture 1340 can be in the form of a hole or a notch in strap 1300 (or an any other suitable form). The third conductor 1930 can further be electrically and/or mechanically connected with strap 1300 by riveting, eyeleting, fastening, soldering, welding, or any other suitable method or combination of methods. The strain relief of third conductor 1930 is at least partially achieved by bending the third conductor 1930 after it passes through strap aperture 1340. In alternative embodiments, the bend of the third conductor 1930 may be omitted.

Similar to the first embodiment, strap 1300 also includes first and second mounting apertures 1310 and 1320 which receive fasteners that are used to fasten wiring device 1100 to the electrical box.

Referring to FIGS. 6-10, wiring device 1100 is formed by first and second housings 1600 and 1700 which are configured to be assembled together. Each of the first and second housings 1600 and 1700 includes a joining face (first and second joining faces 1610 and 1710, respectively). First joining face 1610 is sized and configured to mate with, or contact, the second joining face 1710 when first and second housings 1600 and 1700 are assembled together. Alternatively, a gap, additional housing(s), or other elements/material can be interposed between first and second joining faces 1610 and 1710.

Figure 10:
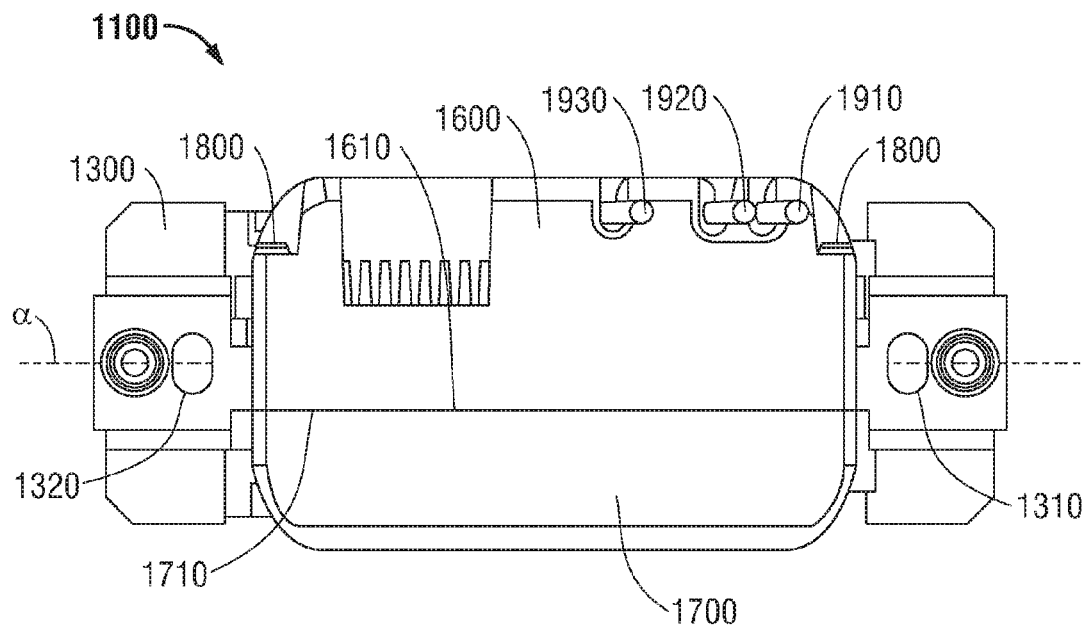
FIG. 10 is a rear view of the wiring device of FIG. 3, according to the disclosure.

Referring to FIG. 10, when first and second housings 1600 and 1700 are assembled together, first and second joining faces 1610 and 1710 are offset from longitudinal axis α. By offsetting first and second joining faces 1610 and 1710 from longitudinal axis α, this allows for one of first and second housings 1600 and 1700 to better support strap 1300 and other components during assembly. In an alternative embodiment, first and second joining faces 1610 and 1710 may lie on a plane collinear with longitudinal axis α. In addition, referring to FIG. 3, when first and second housings 1600 and 1700 are assembled together, first and second joining faces 1610 and 1710 are also perpendicular to face 1202.

Figure 6:
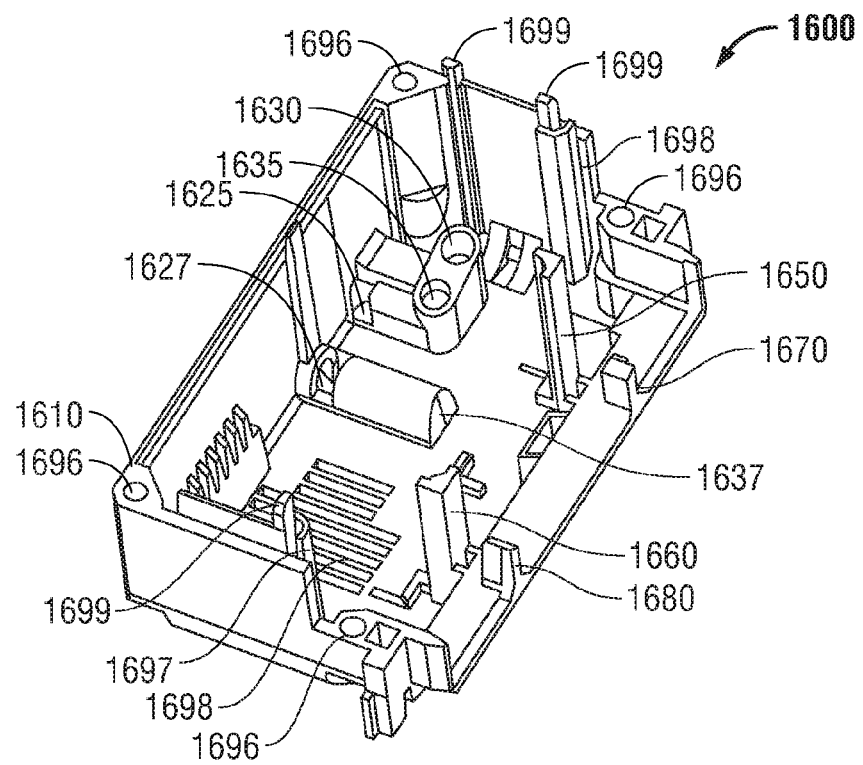
FIG. 6 is a perspective view of the first housing of the wiring device of FIG. 3, according to the disclosure.
Figure 7:
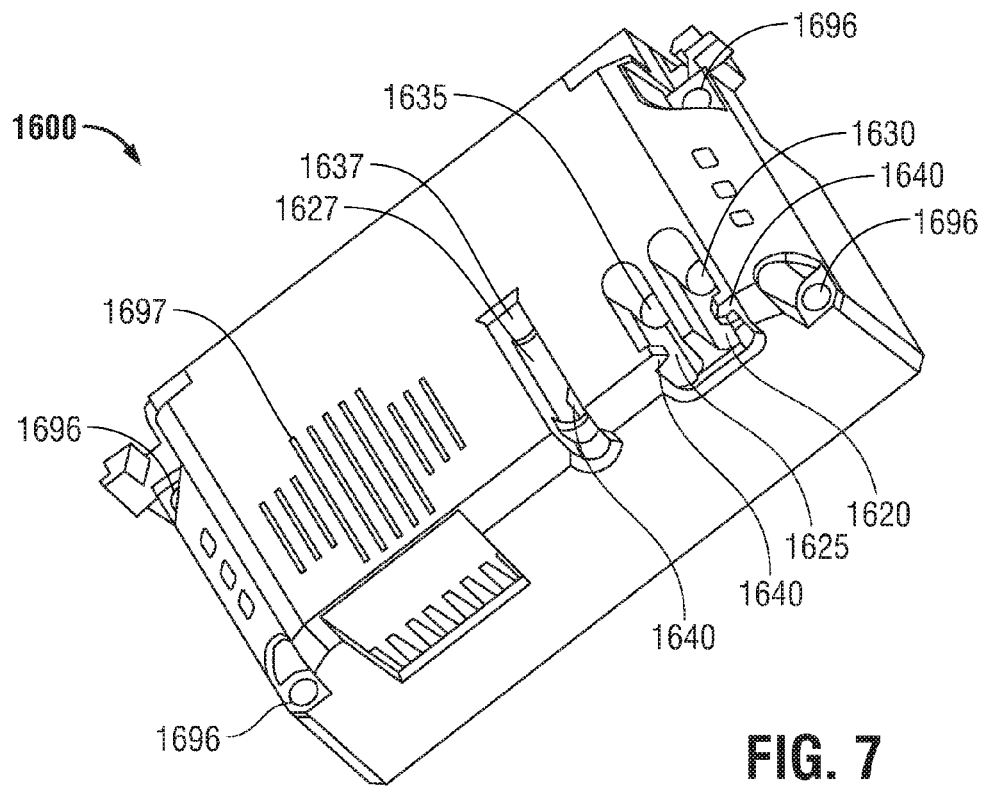
FIG. 7 is another view of the first housing of the wiring device of FIG. 6, according to the disclosure.

First housing 1600 includes at least one strap support projection. As shown in FIG. 6, the first housing 1600 includes first, second, third, and fourth strap support projections 1650, 1660, 1670, and 1680. First, second, third, and fourth strap support projections 1650, 1660, 1670, and 1680 support strap 1300 during and/or after assembly where first and second strap support projections 1650 and 1660 are located on one side of strap 1300 and third and fourth strap support projections 1670 and 1680 are located on the other side of strap 1300. First housing 1600 also includes one or more PCB ledges 1698 and one or more PCB projections 1699 to support the first PCB 1400 during and/or after assembly (more detail below). In addition, first housing 1600 includes one or more vents 1697 to allow heat to escape the housing.

First housing 1600 also includes one or more wire channels 1620, 1625, and 1627 which are used to guide, route, and/or support one or more wires (e.g., conductors or leads) from the exterior to the interior of first housing 1600. Wiring channels 1620, 1625, and 1627 include wire apertures 1630, 1635, and 1637, respectively. Wiring channels 1620, 1625, and 1627 each also include a strain relief projection 1640. Wiring channels 1620 and 1625 include an axis perpendicular to the center axes of wire apertures 1630 and 1635, respectively. In this configuration, the wire would be bent at a right angle, or a substantial right angle, at the end of the wiring channel into the wire aperture. Alternatively, the wire could be bent at any suitable angle, or in other embodiments, the wire could be routed without any bending.

Strain relief projections 1640 help retain the wire in wire channels 1620, 1625, and 1627. The combination of strain relief projections 1640 and the bend of the wire help to prevent force exerted on the wire from being transmitted to the internal components of wiring device 1100.

Figure 8:
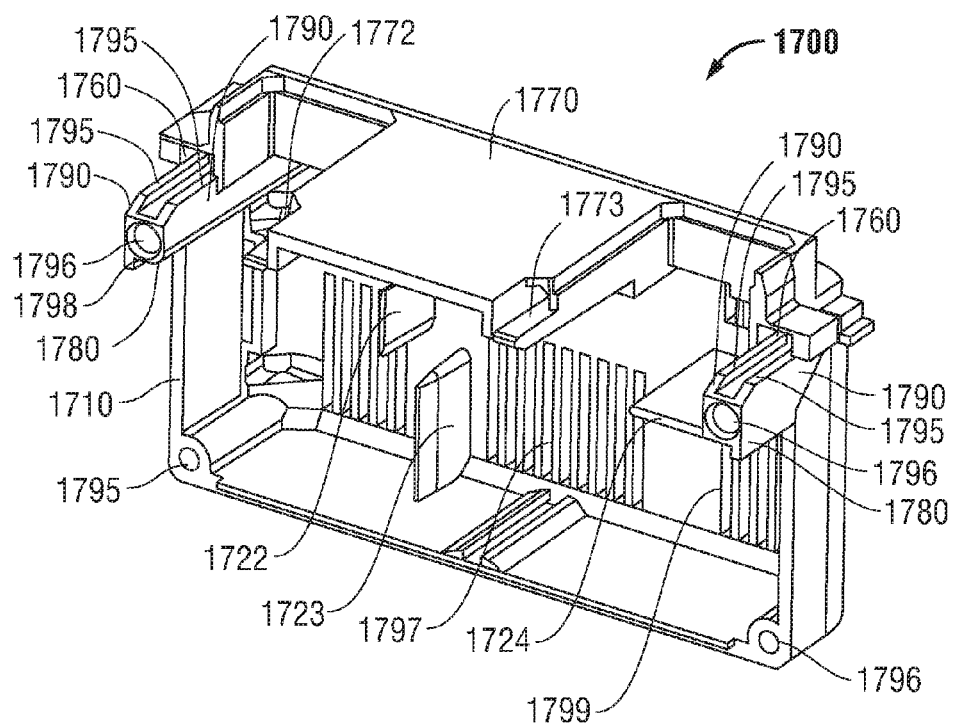
FIG. 8 is a perspective view of the second housing of the wiring device of FIG. 3, according to the disclosure.
Figure 9:
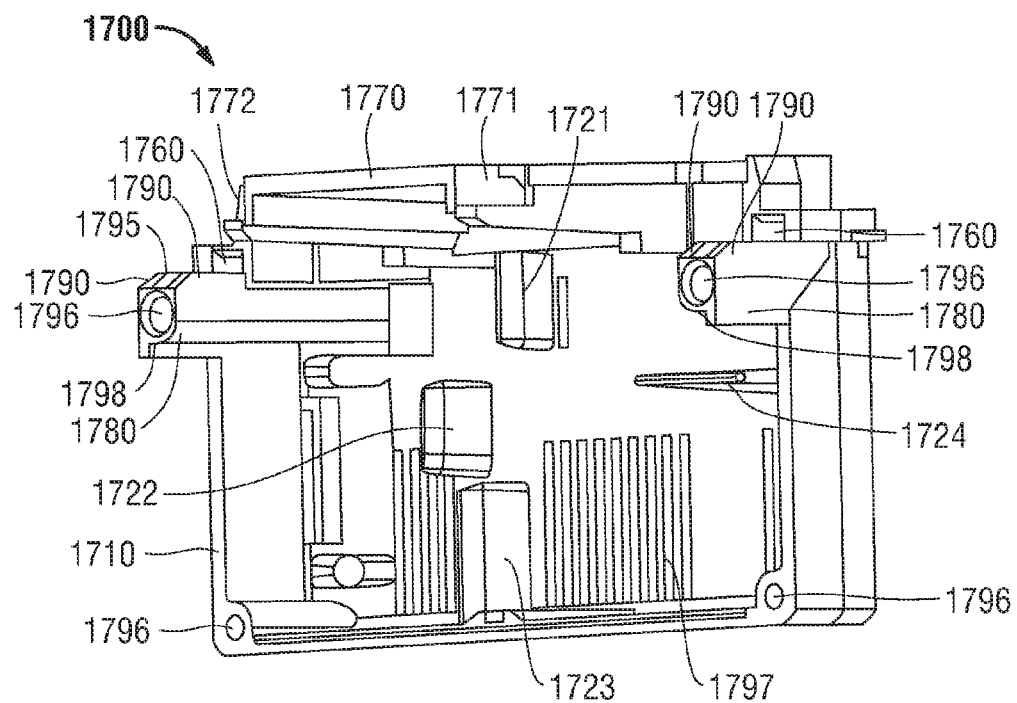
FIG. 9 is another view of the second housing of the wiring device of FIG. 8, according to the disclosure.

Referring to FIGS. 8 and 9, second housing 1700 includes a second joining face 1710 for mating with the first joining face 1610 when the first and second housings 1600 and 1700 are assembled together. Second housing 1700 also includes one or more recesses 1760 for receiving strap projections 1360 when the strap is assembled to first and second housings 1600 and 1700 and the first and second housings 1600 and 1700 are assembled together. The second housing 1700 includes one or more bosses 1780 for receiving one or more fasteners 1800 to assemble first and second housings 1600 and 1700 together. Bosses 1780 include one or more boss projections 1790 which includes one or more boss surfaces 1795. Boss surfaces 1795 help support strap 1300 (similar to first and second strap projections 1650 and 1660 of first housing 1600) during and after assembly. Additionally, bosses 1780 includes one or more PCB ledges 1798 to support the first PCB 1400 during and/or after assembly (more detail below).

The second housing 1700 also includes one or more barriers to facilitate isolation of the line voltage circuitry from the low voltage circuitry in wiring device 1100. Referring to FIG. 9, the wiring device 1100 includes first, second, and third barriers 1721, 1722, and 1723. The region to the left of barriers 1721, 1722, and 1723 would house low voltage circuitry and the region to the right of barriers 1721, 1722, and 1723 would house line voltage circuitry. A fourth barrier 1724 can also be included to further provide for isolation between the line voltage and low voltage ports. Referring to FIG. 9, barrier 1724 is located below low voltage port 1420 and above the line voltage circuitry in wiring device 100. Second PCB 1500 (see FIG. 14) may include one or more apertures 1521, 1522, 1523 and 1524 to allow barriers 1721, 1722, 1723 and 1724 to project therethrough, respectively. By having the barriers pass through apertures in second PCB 1500, the line voltage circuitry is further isolated from the low voltage circuitry since any arcing between the line and low voltage circuitry would have to travel around the barriers (i.e., the barriers projecting through the PCB board create a long dielectric path). Additionally, second housing 1700 further includes one or more vents 1797 to allow heat to escape the housing.

Figure 14:
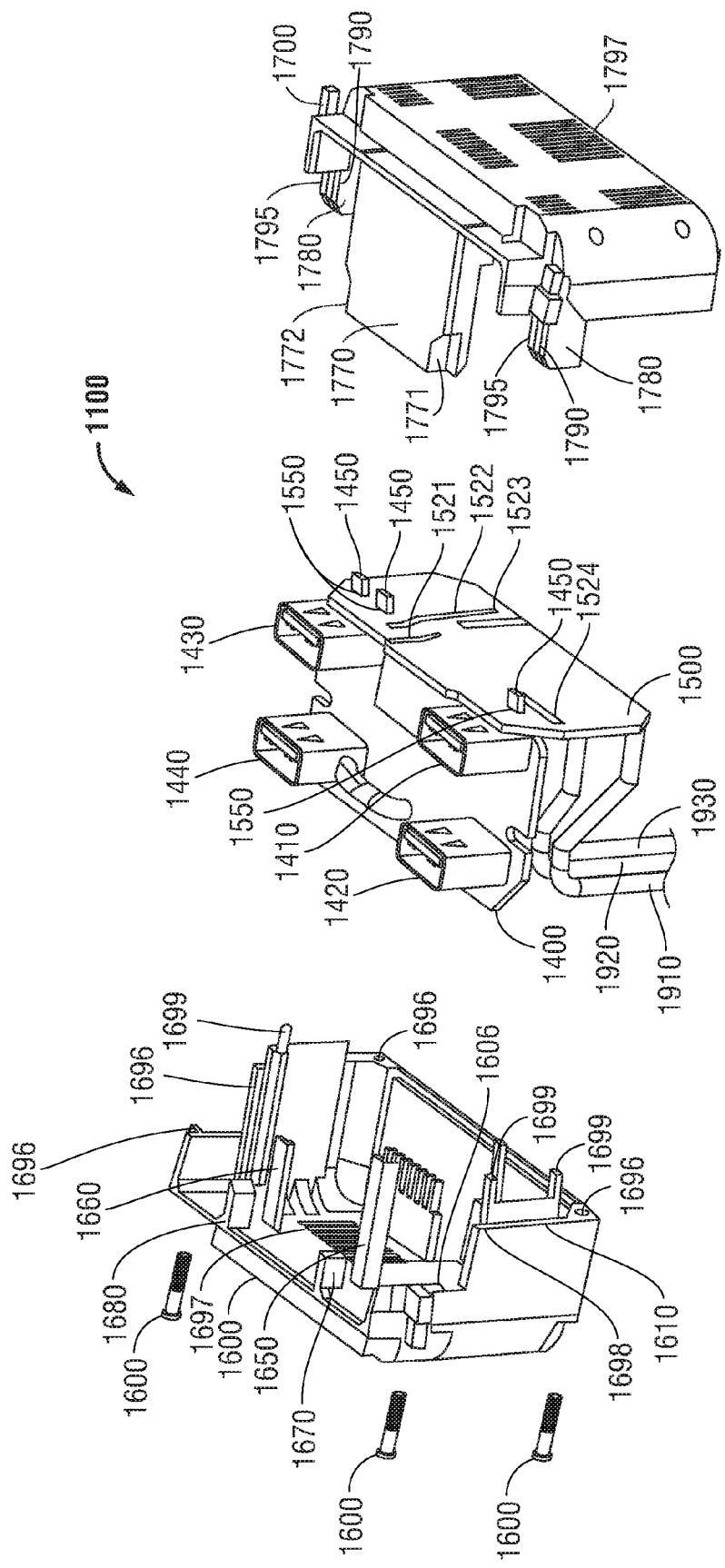
FIG. 14 is an exploded view of the wiring device of FIG. 3 with the face structure and the strap omitted for clarity, according to the disclosure.

Referring to FIG. 14, wiring device 1100 further includes first and second printed circuit boards (PCB's) 1400 and 1500. First PCB 1400 is a logic PCB and second PCB 1500 is a power PCB. First PCB includes first, second, third, and fourth low voltage ports 1410, 1420, 1430, 1440. In the present embodiment, low voltage ports are USB charging ports. However, low voltage ports can be of any suitable type or combination of types. Second PCB 1500 is a power PCB and receives line voltage from conductors 1910 and 1920 (e.g., Phase and Neutral).

First and second PCB's may each include a plating to make an electrical connection therebetween.

First and second PCB's 1400 and 1500 are joined together at a right angle therebetween, without intervening material. The first and second PCB's 1400 and 1500 can be joined by any method now or hereafter known including but not limited to soldering. This makes for efficient use of the volume within the housing, simplified manufacture, and reduced cost. Alternatively, first and second PCB's 1400 and 1500 can be electrically connected together through any suitable medium such as but not limited to PCB connector(s), wires, bus bars, or any combination thereof. To facilitate the electrical and/or mechanical connection of first and second PCB's 1400 and 1500, one first PCB 1400 includes PCB tabs 1450 which are received by PCB connection apertures 1550 on second PCB

1500. Wiring device 1100 further includes circuitry used to transform line voltage to low voltage. This circuitry may reside on the first and/or second PCB. Alternatively, the line to low voltage transformation circuitry may reside at any other suitable location.

Figure 11:
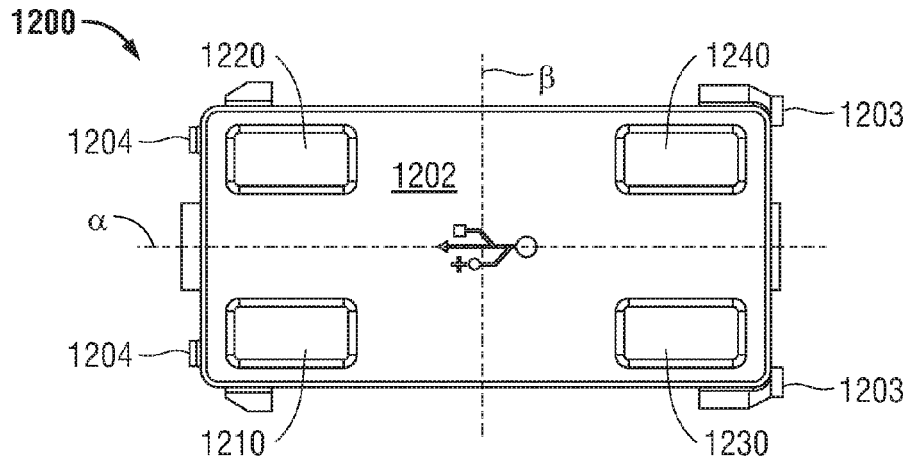
FIG. 11 is a perspective view of the face structure of the wiring device of FIG. 3, according to the disclosure.
Figure 12:
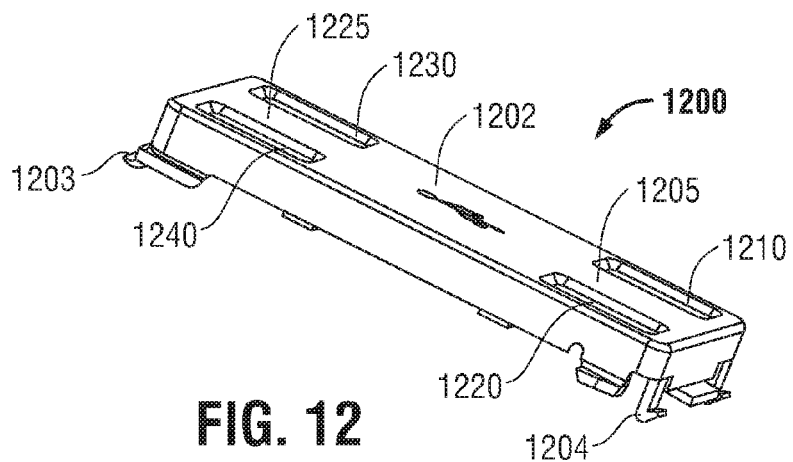
FIG. 12 is another perspective view of the face structure of FIG. 11, according to the disclosure.
Figure 13:
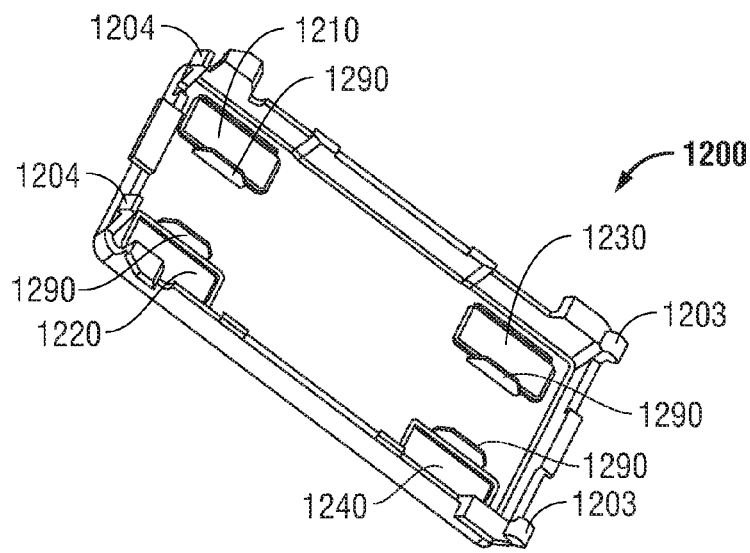
FIG. 13 is another perspective view of the face structure of FIG. 11, according to the disclosure.

Referring to FIGS. 11-13, face structure may be in the form of an interchangeable face structure which can be installed and removed by the user without exposing internal parts of wiring device 1100. Alternatively, face structure may be non-interchangeable. By interchanging face structure 1200, the user can readily change the appearance, color, texture, or other aspects of wiring device 1100. Face structure 1200 can be referred to as a color change kit. Multiple face structures 1202 may be included at the point of sale, either with or without wiring device 1100.

Face structure 1200 includes one or more retention features 1203 and fastening features 1204. To install face structure onto wiring device 1100, retention features 1203 are first inserted under overhangs on first and/or second housings 1600 and 1700 and then face structure is pivoted towards wiring device 1100 until fastening features 1204 snap under additional overhangs on first and/or second housings 1600 and 1700. The process is reversed to remove face structure 1200 from wiring device 1100.

Face structure 1200 also includes one or more port projections 1290 to provide support to one or more low voltage ports. A port projection 1290 is positioned to extend from the rear surface of face structure 1202 next to or near each of the low voltage port apertures 1210, 1220, 1230, and 1240. Alternatively, port projections 1290 can be included on only some of the low voltage port apertures 1210, 1220, 1230, and 1240, or omitted entirely. Port projections 1290 provide lateral support for low voltage ports 1410, 1420, 1430, 1440 once the face structure 1200 is assembled onto the wiring device 1100. That is, port projections 1290 help restrict side-to-side movement of low voltage ports 1410, 1420, 1430, and 1440 in a general direction parallel to lateral axis β. Alternatively, port projections 1290 can be positioned at any suitable location and may take on any suitable shape to restrict movement of low voltage ports 1410, 1420, 1430, and 1440 (or any other elements of wiring device 1100) in any suitable direction.

FIG. 14 is an exploded view of the assembly of wiring device 1100 (strap 1300 is omitted from this figure for clarity). An exemplary assembly process is as follows. First PCB 1400 is inserted into first housing 1600 and supported by PCB ledges 1698. Second PCB 1500 is added next and one or more PCB projections 1699 provide lateral support for second PCB 1500 (i.e., in a direction generally parallel to lateral axis β). First and second conductors 1910 and 1920 are routed through their respective first and second wiring channels 1620 and 1625 and then soldered to second PCB 1500. First and second PCB's 1400 and 1500 are then soldered together. Since the first housing 1600 supports several components prior to the second housing 1700 being assembled, the components are exposed and allow for one or more operations (such as a secondary operation) to be performed on the exposed components. For example, a discrete electronic component can be soldered to one or both of first and second PCB's 1400 and 1500. Additionally, an electronic component such as a triac could be soldered, riveted, welded, or the like to strap 1300 to allow strap 1300 to function as a heat sink for the electronic component.

The third conductor 1930 is routed through strap aperture 1340 and electrically connected to strap 1300. Then, the strap/third conductor is inserted into the assembly and the third conductors are routed through the third wire channel 1637. The strap 1300 rests on first and second strap support projections 1650 and 1660 of first housing 1600.

Next, second housing 1700 is added to the assembly and strap projections 1360 project into recesses 1760 of second housing 1700. Strap 1300 is sandwiched or accommodated between projection 1770 and boss surfaces 1795. Additionally, first PCB 1400 is further supported by PCB ledges 1798 since first PCB 1400 is sandwiched or accommodated between PCB ledges 1698 and 1798. In addition, projection 1770 includes first and second notches 1771 and 1772, which accommodate third and fourth strap support projections 1670 and 1680 of first housing 1600. The first and second notches 1771 and 1772 have a complementary shape to the shape of the third and fourth strap support projections 1670 and 1680 of first housing 1600 such that when assembled, third and fourth strap support projections 1670 and 1680 occupy a substantial portion of the volume of first and second notches 1771 and 1772.

As described above, when the first and second housings 1600 and 1700 are assembled together, the first joining face 1610 mates with the second joining face 1710. Once assembled together, first and second housings 1600 and 1700 enclose, or substantially enclose, the internal components of wiring device 1100.

First and second housings 1600 and 1700 are assembled together via one or more fasteners 1800 through one or more apertures in first and/or second housings 1600 and 1700. Fasteners 1800 may be of any suitable type, such as, but not limited to, screws, rivets, eyelets, snaps, or any combination thereof. In the present embodiment, fasteners 1800 comprise four screws which are inserted through clearance holes 1696 in first housing 1600. The fasteners then extend through support apertures 1350 in strap 1300 and then thread into threaded holes 1796 in second housing 1700. Since the fasteners 1800 project through support apertures 1350, this further restricts movement of strap 1300. Then face structure 1200 is pivoted onto and fastened to the assembly as described above.

During assembly, first, second, and third conductors 1910, 1920, and 1930 are bent towards the first housing 1600 and each snapped under a respective strain relief projection 1640.

Figure 15:
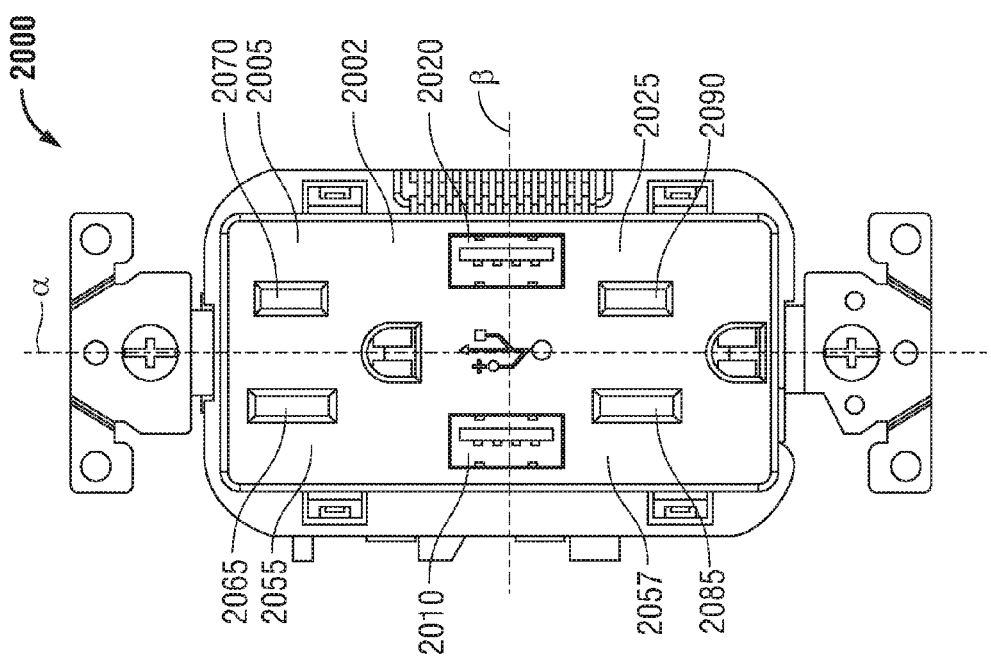
FIG. 15 is a top view of a third embodiment of a wiring device with two low voltage ports and two electrical outlets, where the low voltage port openings are aligned with respect to the outlet openings, according to the disclosure.

FIG. 15 is a top view of a third embodiment of a wiring device with two low voltage ports and two electrical outlets, where the low voltage port openings are aligned with respect to the outlet openings, according to the disclosure.

Wiring device 2000 is configured to be fastened to an electrical box. Wiring device 2000 includes a user-accessible face 2002 which is accessible after wiring device 2000 is fastened to the electrical box. Face 2002 includes a top region 2005 and a bottom region 2025, the top region having a first electrical outlet 2055 and a portion of a two vertical low voltage ports 2010, 2020 (e.g., USB charging ports), whereas the bottom region 2025 has a second electrical outlet 2057 and a portion of the two vertical low voltage outlets 2010, 2020. In this embodiment, face 2002 is generally rectangular but can take any suitable shape.

The area of face 2002 includes a longitudinal axis α and a lateral axis β. Longitudinal axis α divides the area of face 2002 parallel to the long dimension of the face into right and left regions. Lateral axis β divides the area of the face parallel to the short dimension of the face into top and bottom regions. Lateral axis β is at a right angle to longitudinal axis α. In the present embodiment, longitudinal axis α and lateral axis β each bisect the area of the face. However, in other embodiments, longitudinal axis α and lateral β axis may divide the area of the face into unequal areas.

The first electrical outlet 2055 is located entirely within the top region 2005, whereas the second electrical outlet 2057 is located entirely within the bottom region 2025. The two vertical low voltage ports 2010, 2020 are located on the lateral axis, β. The lateral axis β intersects the midpoint of both vertical low voltage ports 2010, 2020. As a result, a portion of the first and second low voltage ports 2010, 2020 is located in the top region 2005 and a portion of the first and second low voltage ports 2010, 2020 is located in the bottom region 2025.

The low voltage port 2010 and 2020 are offset from the center of the face by a greater distance than the first and second outlet apertures 2065 and 2070, respectively, of the first electrical outlet 2055. Similarly, the low voltage ports 2010 and 2020 are offset from the center of the face by a greater distance than the first and second outlet apertures 2085 and 2090, respectively, of the second electrical outlet 2057. This minimizes the potential of an end-user inadvertently plugging a line voltage electrical plug into the low voltage ports 2010, 2020.

Moreover, stated differently, the first and second outlet apertures 2065 and 2070 of the first electrical outlet 2055 and the first and second outlet apertures 2085 and 2090 of the second electrical outlet 2057 are parallel to the longitudinal axis, α, and perpendicular to the lateral axis, β.

Figure 16:
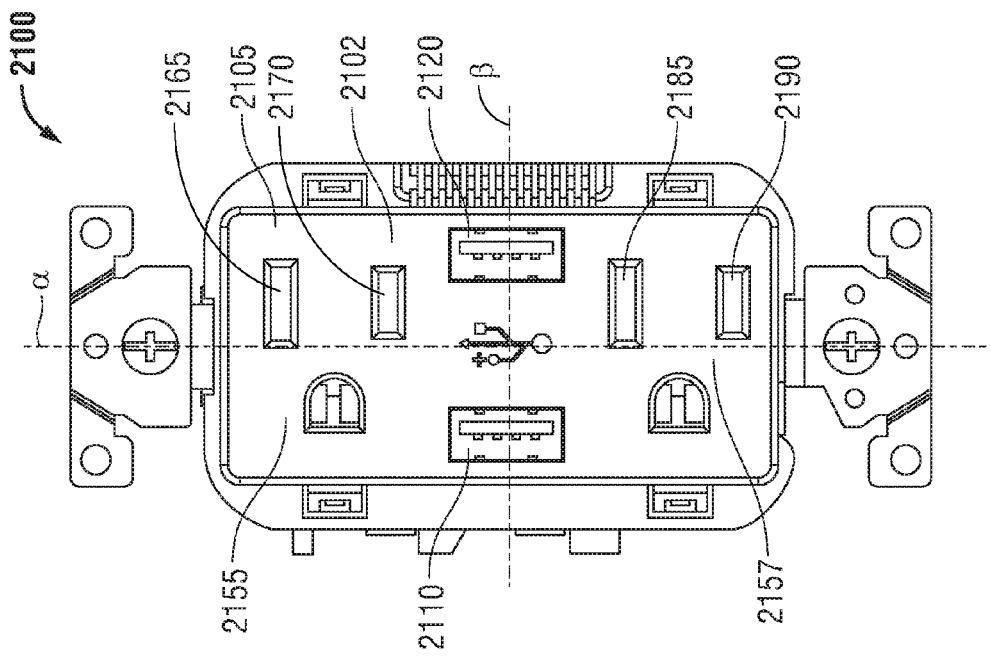
FIG. 16 is a top view of a fourth embodiment of a wiring device with two low voltage ports and two electrical outlets, where the low voltage port openings are misaligned with respect to the outlet openings, according to the disclosure.

FIG. 16 is a top view of a fourth embodiment of a wiring device with two low voltage ports and two electrical outlets, where the low voltage port openings are misaligned with respect to the outlet openings, according to the disclosure.

Wiring device 2100 is configured to be fastened to an electrical box. Wiring device 2100 includes a user-accessible face 2102 which is accessible after wiring device 2100 is fastened to the electrical box. Face 2102 includes a top region 2105 and a bottom region 2125, the top region having a first electrical outlet 2155 and a portion of a two vertical low voltage ports 2110, 2120 (e.g., USB charging ports), whereas the bottom region 2125 has a second electrical outlet 2157 and a portion of the two vertical low voltage outlets 2110, 2120. In this embodiment, face 2102 is generally rectangular but can take any suitable shape.

The area of face 2102 includes a longitudinal axis α and a lateral axis β. Longitudinal axis α divides the area of face 2102 parallel to the long dimension of the face into right and left regions. Lateral axis β divides the area of the face parallel to the short dimension of the face into top and bottom regions. Lateral axis β is at a right angle to longitudinal axis α. In the present embodiment, longitudinal axis α and lateral axis β each bisect the area of the face. However, in other embodiments, longitudinal axis α and lateral β axis may divide the area of the face into unequal areas.

The first electrical outlet 2155 is located entirely within the top region 2105, whereas the second electrical outlet 2157 is located entirely within the bottom region 2125. The two vertical low voltage ports 2110, 2120 are located on the lateral axis, β. The lateral axis β intersects the midpoint of both vertical low voltage ports 2110, 2120. As a result, a portion of the first and second low voltage ports 2110, 2120 is located in the top region 2105 and a portion of the first and second low voltage ports 2110, 2102 is located in the bottom region 2125.

The first and second outlet apertures 2165 and 2170 of the first electrical outlet 2155 and the first and second outlet apertures 2185 and 2190 of the second electrical outlet 2157 are perpendicular to the longitudinal axis, α, and parallel to the lateral axis, β, in contrast to the embodiment of FIG. 15.

Figure 17:
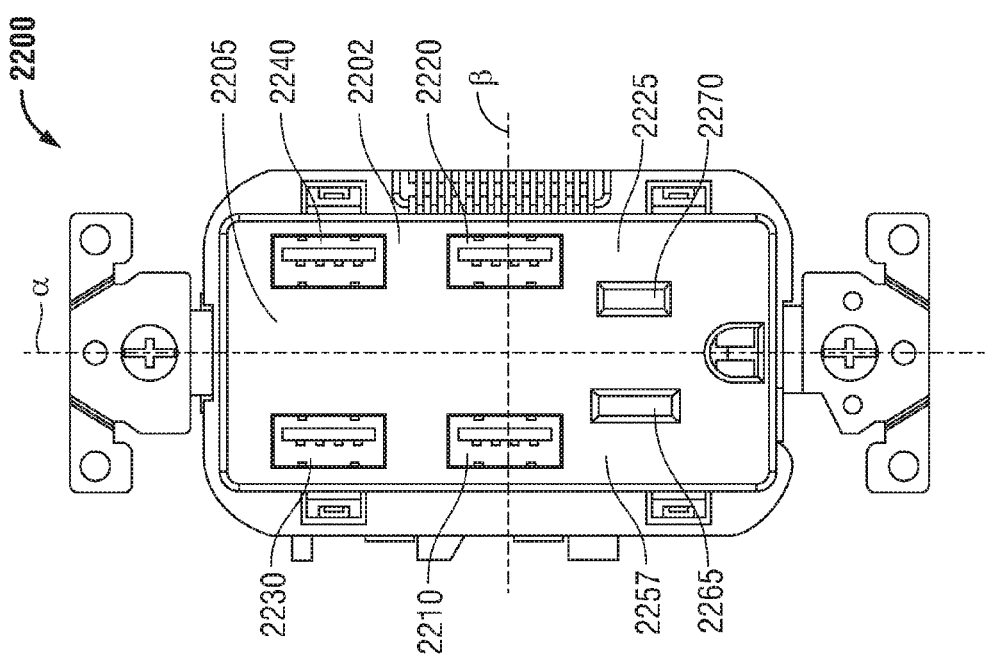
FIG. 17 is a top view of a fifth embodiment of a wiring device with four low voltage ports and a single electrical outlet, according to the disclosure.

FIG. 17 is a top view of a fifth embodiment of a wiring device with four low voltage ports and a single electrical outlet, according to the disclosure.

Wiring device 2200 is configured to be fastened to an electrical box. Wiring device 2200 includes a user-accessible face 2202 which is accessible after wiring device 2200 is fastened to the electrical box. Face 2202 includes a top region 2205 and a bottom region 2225, the top region having two vertical low voltage ports 2230, 2240 (e.g., USB charging ports), as well as a portion of the two vertical low voltage outlets 2210, 2220. The bottom region 2225 has an electrical outlet 2257 and a portion of the two vertical low voltage outlets 2210, 2220. In this embodiment, face 2202 is generally rectangular but can take any suitable shape.

The area of face 2202 includes a longitudinal axis α and a lateral axis β. Longitudinal axis α divides the area of face 2202 parallel to the long dimension of the face into right and left regions. Lateral axis β divides the area of the face parallel to the short dimension of the face into top and bottom regions. Lateral axis β is at a right angle to longitudinal axis α. In the present embodiment, longitudinal axis α and lateral axis β each bisect the area of the face. However, in other embodiments, longitudinal axis α and lateral β axis may divide the area of the face into unequal areas.

The vertical low voltage outlets 2230, 2240 are located entirely within the top region 2205, whereas the electrical outlet 2257 is located entirely within the bottom region 2225. The two vertical low voltage ports 2210, 2220 are located on the lateral axis, β. The lateral axis β intersects the midpoint of both vertical low voltage ports 2210, 2220. As a result, a portion of the first and second low voltage ports 2210, 2220 is located in the top region 2205 and a portion of the first and second low voltage ports 2210, 2202 is located in the bottom region 2225.

The first and second outlet apertures 2265 and 2270 of the electrical outlet 2257 are parallel to the longitudinal axis, α, and perpendicular to the lateral axis, β. Additionally, the low voltage ports 2210 and 2220, and the low voltage ports 2230, 2240 are offset from the center of the face by a greater distance than the first and second outlet apertures 2265 and 2270, respectively, of the electrical outlet 2257. This minimizes the potential of an end-user inadvertently plugging a line voltage electrical plug into the low voltage ports 2210, 2220, 2230, 2240.

Figure 18:
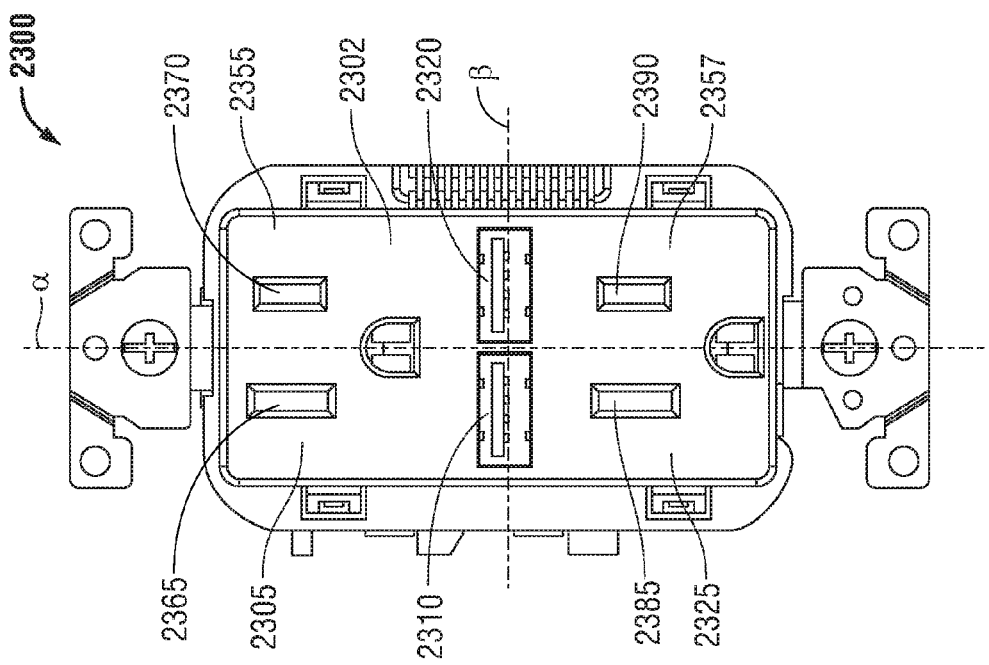
FIG. 18 is a top view of a sixth embodiment of a wiring device with two low voltage ports placed perpendicular with respect to a lateral axis, according to the disclosure.

FIG. 18 is a top view of a sixth embodiment of a wiring device with two low voltage ports placed perpendicular with respect to a lateral axis, according to the disclosure.

Wiring device 2300 is configured to be fastened to an electrical box. Wiring device 2300 includes a user-accessible face 2302 which is accessible after wiring device 2300 is fastened to the electrical box. Face 2302 includes a top region 2305 and a bottom region 2325, the top region having a first electrical outlet 2355 and a portion of a two horizontal low voltage ports 2310, 2320 (e.g., USB charging ports), whereas the bottom region 2325 has a second electrical outlet 2357 and a portion of the two horizontal low voltage outlets 2310, 2320. In this embodiment, face 2302 is generally rectangular but can take any suitable shape.

The area of face 2302 includes a longitudinal axis α and a lateral axis β. Longitudinal axis α divides the area of face 2302 parallel to the long dimension of the face into right and left regions. Lateral axis β divides the area of the face parallel to the short dimension of the face into top and bottom regions. Lateral axis β is at a right angle to longitudinal axis α. In the present embodiment, longitudinal axis α and lateral axis β each bisect the area of the face. However, in other embodiments, longitudinal axis α and lateral β axis may divide the area of the face into unequal areas.

The first electrical outlet 2355 is located entirely within the top region 2305, whereas the second electrical outlet 2357 is located entirely within the bottom region 2325, as in FIG. 15. The two horizontal low voltage ports 2310, 2320 are located on the lateral axis, β. The lateral axis β intersects the midpoint of both horizontal low voltage ports 2310, 2320. As a result, a portion of the first and second low voltage ports 2310, 2320 is located in the top region 2305 and a portion of the first and second low voltage ports 2310, 2320 is located in the bottom region 2325.

The low voltage port 2310 and 2320 are offset from the center of the face by a greater distance than the first and second outlet apertures 2365 and 2370, respectively, of the first electrical outlet 2355. Similarly, the low voltage ports 2310 and 2320 are offset from the center of the face by a greater distance than the first and second outlet apertures 2385 and 2390, respectively, of the second electrical outlet 2357. This minimizes the potential of an end-user inadvertently plugging a line voltage electrical plug into the low voltage ports 2310, 2320.

Moreover, stated differently, the first and second outlet apertures 2365 and 2370 of the first electrical outlet 2355 and the first and second outlet apertures 2385 and 2390 of the second electrical outlet 2357 are parallel to the longitudinal axis, α, and perpendicular to the lateral axis, β. However, the low voltage ports 2310, 2320 are perpendicular to the longitudinal axis, α, and parallel to the lateral axis, β, in contrast to FIG. 15.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

Moreover, when any number or range is described herein, unless clearly stated otherwise, that number or range is approximate. When any range is described herein, unless clearly stated otherwise, that range includes all values therein and all sub-ranges therein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc.

The invention claimed is:

1. A wiring device for fastening in an electrical box, the wiring device comprising:
   a strap having first and second mounting holes to facilitate fastening of the wiring device to the electrical box, a center of the first and second mounting holes lying on an axis parallel to a longitudinal axis of the wiring device;
   a housing having a substantially rectangular face, the face being user-accessible once the wiring device is fastened to the electrical box, the face having an area which is divided into first and second regions by a lateral axis, the lateral axis being perpendicular to the longitudinal axis;
   a first low voltage port being accessible through a first low voltage port aperture on the first region of the substantially rectangular face;
   a second low voltage port being accessible through a second low voltage port aperture on the first region of the substantially rectangular face;
   a third low voltage port being accessible through a third low voltage port aperture on the second region of the substantially rectangular face; and
   a fourth low voltage port being accessible through a fourth low voltage port aperture on the second region of the substantially rectangular face;
   wherein a longitudinal dimension of each of the first, second, third, and fourth low voltage port apertures is substantially parallel to the longitudinal axis of the wiring device.

2. The wiring device of claim 1, wherein the lateral axis substantially bisects the area of the face.

3. The wiring device of claim 1, wherein the first and third low voltage port apertures are substantially aligned with each other.

4. The wiring device of claim 1, wherein the second and fourth low voltage port apertures are substantially aligned with each other.

5. The wiring device of claim 1, wherein at least one of the first, second, third, and fourth low voltage ports is a USB charging port.

6. A wiring device for installation into an electrical box in a surface of a building, the wiring device having internal components, the wiring device comprising:
   a strap adapted and configured to fasten the wiring device to the electrical box;
   a housing configured to substantially enclose the internal components of the wiring device, wherein the housing further comprises:
   a first housing portion; and
   a second housing portion;
   wherein the first and second housing portions are adapted and configured to be assembled together, such that the first and second housing portions mate along a plane perpendicular to the surface of the building.

7. The wiring device of claim 6, further comprising:
   a face structure which is user-accessible once the wiring device is installed into the electrical box, the face structure having first and second face portions;
   wherein the first face portion overlies the first housing portion and the second face portion overlies the second housing portion; and
   wherein the strap further comprises a strap tab which projects towards the face structure, the strap tab being sized and configured to absorb an impact to the face structure.

8. The wiring device of claim 6, further comprising:
   a first printed circuit board (PCB) ledge on the first housing portion; and
   a second PCB ledge on the second housing portion;
   wherein when the first and second housing portions are assembled together, the first and second PCB ledges cooperate to form a channel to accommodate a PCB therebetween.

9. The wiring device of claim 6, further comprising:
   a first printed circuit board (PCB); and
   a second printed circuit board (PCB);
   wherein the first and second PCB's are soldered directly together at a right angle therebetween.

10. The wiring device of claim 9, further comprising:
    a USB port coupled to the first PCB; and
    voltage transforming circuitry coupled to the second PCB;
    wherein the voltage transforming circuitry converts line voltage to low voltage.

11. The wiring device of claim 6, further comprising:
    a fastener; and
    a leg extending from the strap, the leg having a support aperture;

wherein when the first and second housing portions are assembled together, the fastener passes through the first housing portion, the support aperture of the leg of the strap, and the second housing portion to at least partially restrict displacement of the strap with respect to at least one of the first and second housing portions.

12. The wiring device of claim 6, further comprising:
a strap projection extending from the strap; and
a recess on at least one of the first and second housing portions;
wherein when the first and second housing portions are assembled together, the strap projection extends into the recess to at least partially restrict displacement of the strap with respect to at least one of the first and second housing portions.

13. The wiring device of claim 6, wherein the housing further comprises:
a wire channel having first and second ends, the wire channel accessible from an exterior of the wiring device;
a wire aperture in the housing proximate to the first end of the wire channel; and
a strain relief projection proximate to the second end of the wire channel;
wherein the wire channel, wire aperture, and strain relief projection cooperate to support and route a wire between the exterior and an interior of the housing.

14. The wiring device of claim 6, further comprising:
a plurality of strap support projections extending from the first or second housing portions;
wherein when the first and second housing portions are assembled, the strap is positioned between two of the plurality of strap support projections.

15. The wiring device of claim 6, further comprising:
a face structure configured to be selectively added to or removed from the housing, the face structure further comprising:
a retention feature adapted to pivotally engage a corresponding retention feature on the wiring device; and
a fastening feature adapted to engage a corresponding fastening feature on the wiring device to maintain the face structure in an installed position.

16. The wiring device of claim 15, wherein:
the retention feature includes a first arm; and
the fastening feature includes a second arm;
wherein a stiffness of the first arm is substantially greater than a stiffness of the second arm.

17. A wiring device comprising:
a housing configured to substantially enclose internal components of the wiring device, wherein the housing further comprises:
a face having an area divided into first and second regions by a lateral axis, the lateral axis being perpendicular to a longitudinal axis; and
a first housing portion and a second housing portion, where the first and second housing portions are configured to be assembled together; and
a first printed circuit board (PCB) and a second printed circuit board (PCB), where the first and second PCB's are disposed within the housing and are configured to be connected together in a perpendicular manner, and where at least one of the PCB's comprises circuitry for a low voltage port.

18. The wiring device of claim 17, wherein the first PCB is a logic PCB and the second PCB is a power PCB.

19. The wiring device of claim 17, wherein the first PCB has a first plating and the second PCB has a second plating, such that the first and second PCB's are electrically connected to each other.

20. The wiring device of claim 17, wherein the first and second housing portions form a single housing when assembled together.

21. The wiring device of claim 17, wherein the first region includes two low voltage ports, whereas the second region includes a single electrical outlet.

22. The wiring device of claim 21, wherein the two low voltage ports are offset from the longitudinal axis by a predetermined distance.

23. The wiring device of claim 17, wherein the first region includes a first set of low voltage ports and the second region includes a second set of low voltage ports.

24. The wiring device of claim 23, wherein the first set of low voltage ports of the first region and the second set of low voltage ports of the second region are offset from the longitudinal axis by a predetermined distance.

25. The wiring device of claim 17, wherein the first region includes a first electrical outlet, the second region includes a second electrical outlet, and two low voltage ports occupy at least a portion of both the first and second regions.

26. The wiring device according to claim 25, wherein the low voltage ports are parallel to the longitudinal axis.

27. The wiring device according to claim 25, wherein the low voltage ports are perpendicular to the longitudinal axis.

28. The wiring device according to claim 17, wherein the first region includes a first pair of low voltage ports, the second region includes a single electrical outlet, and a second pair of low voltage ports occupy at least a portion of both the first and second regions.

29. The wiring device of claim 28, wherein the pair of first and second low voltage ports are offset from the longitudinal axis by a predetermined distance.

* * * * *